No. 607,570. Patented July 19, 1898.
H. G. McLEAN.
FILTER.
(Application filed Oct. 19, 1897.)
(No Model.)
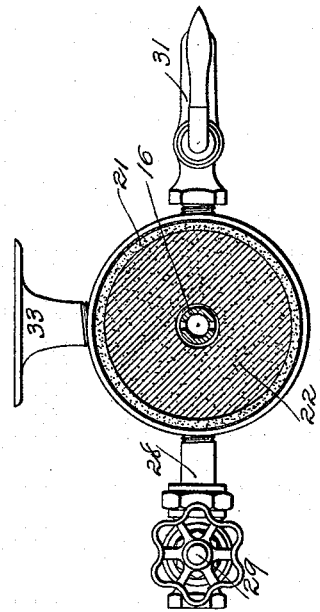
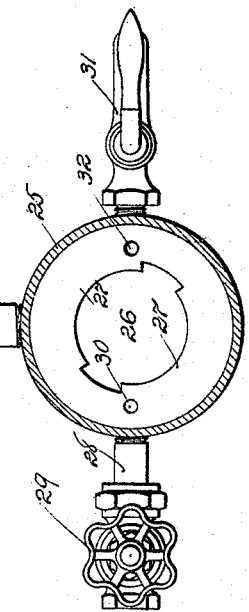
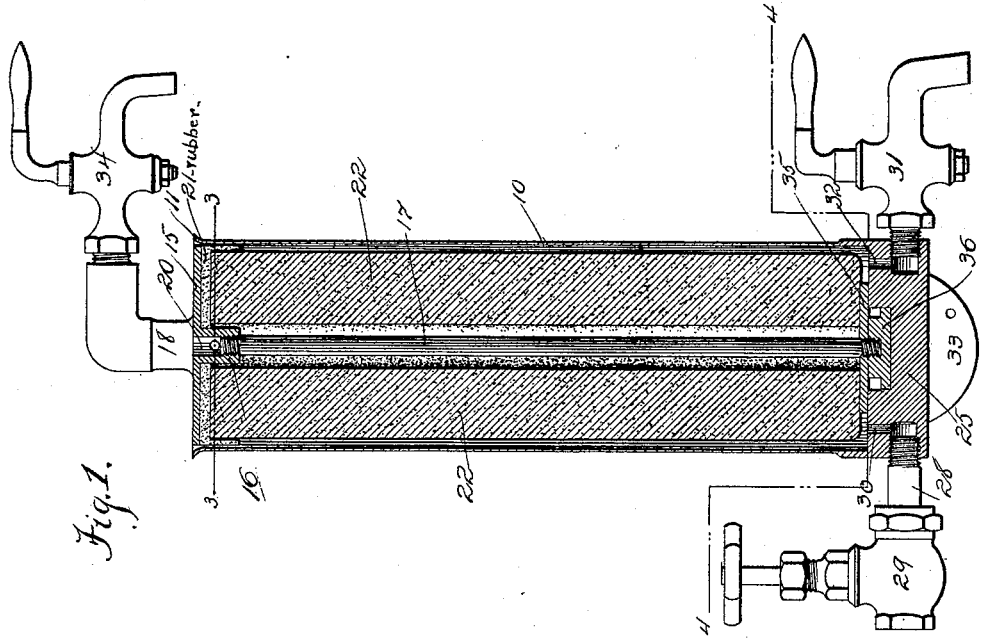
Witnesses: Inventor: Horace G. McLean,
By Thomas G. and J. Ralph Orwig,
Attorneys.
THE NORRIS PETERS CO., PHOTO-LITHO., WASHINGTON, D. C.

UNITED STATES PATENT OFFICE.

HORACE G. McLEAN, OF RACINE, MISSOURI, ASSIGNOR TO THE ALLEN TRIPOLI COMPANY, OF SAME PLACE.

FILTER.

SPECIFICATION forming part of Letters Patent No. 607,570, dated July 19, 1898.

Application filed October 19, 1897. Serial No. 655,752. (No model.)

*To all whom it may concern:*

Be it known that I, HORACE G. McLEAN, a citizen of the United States, residing at Racine, in the county of Newton and State of Missouri, have invented a new and useful Filter, of which the following is a specification.

The object of this invention is to provide a water-filter in which are combined the advantageous qualities of a comparatively large filtering-surface, quick, convenient, and ready access to the stone for purposes of cleaning or replacing same, perfect watertight connection at the end of the stone even though the water is under great pressure, and, further, a cheapness and simplicity of construction that will render the device commercially practicable.

My invention consists in certain details in the construction, arrangement, and combination of the various parts of the device, as hereinafter set forth, pointed out in my claim, and illustrated in the accompanying drawings, in which—

Figure 1 shows a vertical longitudinal sectional view of the complete device. Fig. 2 shows a horizontal transverse sectional view taken through the line 3 3 of Fig. 1. Fig. 3 shows a similar view taken on the line 4 4 of Fig. 1.

Referring to the accompanying drawings, the reference-numeral 10 is used to indicate the casing for the filter. It is composed of a sheet-metal tube or cylinder 10, having its one end flared outwardly at 11.

The filter comprises a metal disk 15, having an inwardly-projecting central lug 16, internally screw-threaded. The disk is of a size somewhat smaller than the interior of the cylinder 10.

17 indicates a rod screw-threaded at both ends, designed to enter the screw-threaded projections 16, and thereby bind the two heads together. In the disk 15 I have provided an upwardly-projecting part 18, having a cock 34 connected therewith and communicating with an opening 20 in the projection 16, so that an opening is provided from the interior of the filtering-stone through the cock 34.

The reference-numeral 21 indicates a cup-shaped rubber packing device having a central opening designed to admit the projection 16 and of a diameter to fill the interior of the cylinder 10.

The reference-numeral 22 is used to indicate the filter proper, preferably made of Tripoli stone and cylindrical in shape, with a central longitudinal opening somewhat larger in diameter than the projections 16, and the diameter of the stone is somewhat less than the interior diameter of the cup 21.

The reference-numeral 25 is used to indicate a cast base having an annular central opening 26 at its top provided with overlapping inwardly-projecting rims 27. At one side of the base is a supply-pipe 28, having a cut-off valve 29 therein, provided with an upwardly-extending opening 30 to communicate with the end of the supply-pipe and the interior of the cylinder. At the opposite side of the base is a cock 31, through which unfiltered water may be drawn off and which communicates with the interior of the cylinder through the opening 32.

33 indicates a support formed on or fixed to one side of the base to provide means whereby the filter may be screwed to a support presented vertically.

These parts are assembled by first placing the rubber cup-shaped packing device upon the plate 15, with the projection 16 extending through the central opening of the cup. Then the rod 17 is screwed into the plate 25 and the T-shaped device 36 is screwed to the part of the rod extending through the said plate. Then the rod 17 is passed through the central opening of the stone and the top plate is screwed to the rod 17 until the stone is securely clamped between the rubber cup-shaped device and the plate 25. The stone and its connected parts are then placed in the cylinder and turned at an angle, so as to be securely held. No screwing or other connections of any kind whatever are necessary. The cut-off valve 29 may then be kept open, and if it is desired to draw off unfiltered water the cock 31 is opened while the cock 34 is closed, and if it is desired to draw filtered water the cock 31 is closed and the cock 34 opened, whereupon the water will pass through the stone upwardly through the central opening therein and through the opening 20 and out of the cock 34. These parts are all firmly secured together, and it is obvious that the stone may be easily handled in this manner, and inasmuch as the only connection between the filtering device and the casing lies in the frictional contact of the rubber packing device with the cylinder the same may be readily and quickly placed in the cylinder or removed therefrom. In placing the filter and connected parts within the casing it is inserted in the outwardly-flared end thereof, which same will make the placing of the said cup-shaped rubber packing device in the end of the cylinder very simple and easily accomplished. When the water is admitted in the inflow-pipe, it is obvious that it will exert a pressure in all directions, and inasmuch as it can enter between the stone and the rubber packing device the edge of the said rubber packing device will be forced outwardly into engagement with the interior of the cylinder, and no matter how hard the pressure of water upon the device may be the rubber packing device will be forced outwardly against the interior of the cylinder with sufficient force to prevent leakage around it. Then as soon as the pressure is removed it will contract, and the device may be easily removed from its casing to be cleaned or for any other purpose.

Heretofore filters of this class have been connected with the casing by screw-threaded caps, bolts, &c., in order to secure the stone in place and to prevent leakage. These devices not only add greatly to the original cost of the filter, but in practical use a great amount of time is necessary and the use of a number of tools in order to detach the same from its casing, so that it may be cleaned. This has obtained heretofore to such an extent that unskilled persons have generally refrained from attempting to remove the stones from the filters, and for this reason they have been neglected and not cleaned and their usefulness greatly impaired. Furthermore when the stones have been removed by unskilled persons great difficulty has been experienced in getting them together again in such a way as to produce water-tight joints, and in addition to this in many of the devices the pressure upon the stones necessary to produce water-tight joints has been so applied as to break the stones. It is obvious that all of these disadvantages in the use and construction of filters have been overcome by the construction and arrangement shown and described.

Having thus described the filter, what I claim as new therein, and desire to secure by Letters Patent of the United States therefor, is—

An improved filter, comprising in combination, a cylinder having one end flared outwardly, a cast base having a central opening, a cylindrical stone having a central opening, a supply-pipe attached to the base and communicating with the interior of the cylinder between the casing and the stone, a cut-off valve in said pipe, an exhaust-cock fixed to the base and communicating with the interior of the cylinder between the casing and the stone, a rubber, cup-shaped packing device designed to overlap the upper end surface of the stone, a metal plate designed to be placed at the upper end of said stone upon said packing device, and having an inwardly-extending, internally-screw-threaded projection, a hollow projection extending upwardly from the said plate and communicating with the interior of the cylinder, a cock connected therewith through which the filtered liquid may be drawn off, a second plate designed to be placed at the lower end of said stone and having an internally-screw-threaded opening, a screw-threaded rod designed to enter the aforesaid internally-screw-threaded projection and pass through the central opening of the stone and the opening in the said plate, and a T-shaped device designed to be detachably connected with the said rod and to enter the central opening in the base, all arranged and combined substantially in the manner set forth and for the purposes stated.

HORACE G. McLEAN.

Witnesses:
LUTIE McLEAN,
CHAS. H. STEWART.